United States Patent [19]
Chandler

[11] Patent Number: 5,549,839
[45] Date of Patent: Aug. 27, 1996

[54] INDUSTRIAL SOLVENT BASED ON A PROCESSED CITRUS OIL FOR CLEANING UP PETROLEUM WASTE PRODUCTS

[76] Inventor: William C. Chandler, 949 SW. 131st Ave., Davie, Fla. 33325

[21] Appl. No.: 426,087

[22] Filed: Apr. 21, 1995

[51] Int. Cl.⁶ .............................. C09K 3/32; C11D 3/44; C11D 3/60; C11D 7/50
[52] U.S. Cl. ............................ 510/365; 134/40; 210/691; 210/925; 252/364; 510/366; 510/413; 510/461; 510/491
[58] Field of Search .................................. 252/162, 170, 252/174.21, 364, DIG. 8; 210/691, 925; 134/40

[56] References Cited

U.S. PATENT DOCUMENTS

| | | | |
|---|---|---|---|
| 4,511,488 | 4/1985 | Matta | 252/162 |
| 4,620,937 | 11/1986 | Dellutri | 252/143 |
| 4,648,905 | 3/1987 | Peck et al. | 106/24 |
| 4,659,498 | 4/1987 | Stoufer | 252/153 |
| 5,156,760 | 10/1992 | Marchese et al. | 252/171 |
| 5,190,679 | 3/1993 | McDonald | 252/41 |
| 5,308,531 | 5/1994 | Urfer et al. | 252/174.17 |
| 5,340,493 | 8/1994 | Principato | 252/170 |

FOREIGN PATENT DOCUMENTS

| | | |
|---|---|---|
| 4-79961 | 3/1992 | Japan . |

OTHER PUBLICATIONS

Chemical Abstracts Registry No. 9002–93–1 (no date).

*Primary Examiner*—Linda Skaling Therkorn
*Attorney, Agent, or Firm*—Malin, Haley, DiMaggio & Crosby, PA

[57] ABSTRACT

An industrial solvent that is non-toxic, biodegradable, and completely safe for human and animal contact, based primarily on a d-limonene composition made up of 95 percent pure d-limonene in approximately 73 to 74 percent volume, a surfactant such as ethoxylated nonyl phenol in approximately 16 to 17 percent by volume, and a tall oil fatty acid in approximately 9 to 10 percent by volume, which is mixed together in a liquid form and applied directly at full strength to an oil spill or other waste petroleum products such as tar or grease, the composition being completely safe and cost effective for petroleum waste cleanup.

4 Claims, No Drawings

INDUSTRIAL SOLVENT BASED ON A PROCESSED CITRUS OIL FOR CLEANING UP PETROLEUM WASTE PRODUCTS

BACKGROUND OF THE INVENTION

1. Field of the Invention

This invention relates to a composition of matter used as an industrial solvent composition for cleaning up petroleum waste products, the composition herein based on d-limonene, a monocyclic, optically active terpene, typically derived from citrus oils, but also found in, for example, neroli, bergamot, caraway, and other oils as an active ingredient, combined with a surfactant such as an ethoxylated nonyl phenol (hereinafter nonyl phenol) in conjunction with a fatty acid, the composition being effective for acting as a cleaning solvent for petroleum products, such as oil spill cleanups or removal of tar and grease waste.

2. Description of the Prior Art d-limonene, commonly commercially sold as "citrus stripper oil," is a widely distributed optically active terpene, typically commercially obtained as a byproduct in the production of citrus molasses, which includes citrus peel oil (usually derived from a mixture of citrus fruits, particularly lemon, orange, and lime) that has been subjected to a lime treatment in a feed mill and recovered by distillation from citrus press liquor. The stripper oil, which usually contains in excess of 95 percent d-limonene, is one of the purest commercial sources of d-limonene, and is commercially employed in the production of a variety of organoleptic material, such as spearmint oil flavor (1-carvone) or peppermint oil flavor. It is believed that the compositions in each of these trademark products are certainly based on citrus oils and specifically, d-limonene, although the specific chemical composition is believed to be a trade secret of Golden Gem and is not known to the Applicant.

U.S. Pat. No. 4,620,937 issued Nov. 4, 1986 to Joseph Dellutri describes an all-purpose cleaner containing d-limonene. In particular, the composition is a cleaning agent for hand cleaner and all-purpose cleaner that uses distilled d-limonene and acids in a non-ionic detergent. Although various uses of citrus oils are known in the prior art, Applicant has found that the use of a d-limonene based composition that includes surfactants such as ethoxylated nonyl phenol or ethoxylated octyl phenol (hereinafter octyl phenol) in conjunction with a fatty acid marketed under the trade name Unitol DSR in a prescribed quantity proportionate to the volume produces an extremely effective industrial solvent that can be used for oil cleanup, such as oil spills, and as a general industrial solvent in the oil industry to remove grease, tar, and other oil waste products. Petroleum oil waste products, such as oil spills, or even in industrial use for machinery oil and grease spills has become an extremely vexing environmental problem. Applicant believes that with the use of the present invention, oil spills can be cleaned up cost effectively by the use of the present invention which Applicant believes creates a microencapsulation of oil molecules, which makes the oil more biodegradable for quick removal and cleanup operations. Of even more importance is the fact that the present invention is non-toxic to human beings and the environment and does not create any environmental problem. In fact, on the contrary, it is biodegradable and environmental friendly.

SUMMARY OF THE INVENTION

The basic ingredient used in this invention is processed uniform terpene to produce at least 95 percent pure d-limonene. For the primary industrial solvent, the d-limonene is mixed with nonyl phenol in a prescribed volume relationship. In addition, a fatty acid such as tall oil acid, known under the trade name of Unitol DSR, the liquified mixture or composition in the proper proportions provides for a full-strength industrial cleaner of low cost that is ready to be applied directly to an oil spill or directly applied to tar, grease, or other industrial petroleum waste products, such as car oil or the like.

In the preferred embodiment and primary use of the product, the composition is comprised of 73.3 percent by volume processed 95 percent pure d-limonene combined with 16.25 percent nonyl phenol by volume and 9.75 percent by volume tall oil fatty acid, known under the trademark of Unitol DSR. These ingredients may be varied slightly to encompass approximately 16 to 17 percent nonyl phenol, 9 to 10 percent tall oil acid, and 73 to 74 percent d-limonene, all of which is by volume. As a substitute for the nonyl phenol, which is a surfactant, octyl phenol (10 mole) could be utilized. Once the ingredients are blended together, the composition is ready for use.

In a specific example, the composition described above would be applied directly to an oil spill in the ocean in such proportions that it is believed that microencapsulation of the oil molecules takes place which immediately makes it more biodegradable, resulting in a cleanup of the oil spill. For use in an industrial spill in a closed environment such as a building, the composition described in the present invention above would be applied directly in full strength to the actual tar or grease spot or stain to be cleaned up. The composition will not harm the surface to be cleaned.

In summary, Applicant has found a very effective industrial solvent for all types of oil, grease, tar, and other petroleum waste product cleanup that is low cost, that is completely biodegradable, that is non-toxic, and which does not harm the environment.

It is an object of this invention to provide an improved industrial solvent for commercial and industrial use to clean up petroleum based oil waste product spills that is non-toxic and safe for human beings and animals, as well as the environment, while remaining an effective industrial solvent.

It is another object of this invention to provide an improved composition of matter using d-limonene based compositions for an improved industrial solvent for cleaning up petroleum wastes.

And yet still another object of this invention is to provide an improved composition of matter based on d-limonene that is a citrus oil that results in an environmentally safe industrial solvent for cleaning petroleum waste such as oil spills that is non-toxic and safe for human beings and that is low cost and effective for oil spill cleanups.

In accordance with these and other objects which will become apparent hereinafter, the instant invention will now be described with particular reference to the accompanying drawings.

DESCRIPTION OF THE PREFERRED EMBODIMENTS

Processed uniform terpene, which is citrus stripper oil having in excess of 95 percent pure d-limonene, is the primary composition used in the present invention.

In addition to the d-limonene ingredient, a surfactant is used in approximately 16 percent by volume, such as nonyl phenol or octyl phenol. Another ingredient is the use of a fatty acid, such as a tall oil fatty acid, in approximately 9 to 10 percent by volume. Thus, the preferred embodiment of the invention consists of 73 to 74 percent pure d-limonene, at least 95 percent pure, 16 to 17 percent nonyl phenol, and 9 to 10 percent of a tall oil acid, such as a product sold under the trademark Unitol DSR. The ingredients are mixed together, forming a liquid that once mixed together is ready to be applied full-strength to a petroleum waste cleanup effort such as an oil spill or grease or tar stain that is to be cleaned up.

It is believed that the range of ingredients and the volume stated above are somewhat critical to the invention, but that slight changes could be made without notable changes in efficacy in oil removal. One of the primary advantages of the present invention is that it is cost effective and can be used in large volume quantities for accomplishing cleanup of oil spills and the like without disturbing the environment.

The following are descriptions of the surfactants nonyl phenol (4 mole) or nonyl phenol (9.5 mole) that can be used in the invention.

NONYL PHENOL 4 MOLE
DESCRIPTION
POLYOXYETHYLENE (4) ALKYL ARYL ETHER
GENERAL CHARACTERISTICS

| Classification | Nonionic detergent |
| --- | --- |
| Form | Pale yellow to colorless oily liquid |
| Specific gravity @ 25 DEG C | Approx. 1.0 |
| Viscosity @ 25 DEG C | Approx. 220 cps. |
| Flash Point | Approx. 149 DEG C (300 DEG F) |
| Fire Point | Approx. 149 DEG C (300 DEG F) |
| HLB number * | 8.9 |

SOLUBILITIES

A) Soluble in methanol, ethanol, IPA, carbon tetrachloride, cellosolve, vegetable oil, and solvents
B) Insoluble in water, ethyleneglycol and mineral oil

STANDARD SPECIFICATIONS

| Hydroxyl number | 136–146 |
| --- | --- |
| Saponification number | Max. 2.0 |
| Acid number | Max. 1.0 |
| pH | 5.0–8.0 |
| Water content, % | Max. 0.8 |
| Color, APHA | Max. 100 |

* Hydrophile-lipophile balance rating

NONYL PHENOL 9.5 MOLE
DESCRIPTION
POLYOXYETHYLENE (9.5) ALKYL ARYL ETHER
GENERAL CHARACTERISTICS

| Classification | Nonionic detergent |
| --- | --- |
| Form @ 25 DEG C | Pale yellow to colorless oily liquid |
| Specific gravity @ 25 DEG C | Approx. 1.06 |
| Viscosity @ 25 DEG C | Approx. 245 cps. |
| Flash point | Above 149 DEG C (300 DEG F) |
| Fire point | Above 149 DEG C (300 DEG F) |
| HLB number * | 13.15 |

SOLUBILITIES

A) Soluble in water, butyl cellosolve, chlorinated solvents, lower alcohols, ethylene glycol, and xylene.
B) Slightly soluble in vegetable oils.

C) Insoluble in mineral oils and petroleum solvents.

STANDARD SPECIFICATIONS

| Hydroxyl number | 83–93 |
| --- | --- |
| Saponification number | Max. 2.0 |
| Acid number | Max. 1.0 |
| pH | 5.0–8.0 |
| Water content, % | Max. 0.8 |
| Color, APHA | Max. 100 |
| Cloud point, DEG C | 54–58 |

* Hydrophile-lipophile balance rating

EXAMPLE—INDUSTRIAL SOLVENT FOR OIL SPILL CLEANUP

A liquid volume of 74 percent d-limonene is mixed with 16.25 percent nonyl phenol, together with 9.75 percent by volume of tall oil fatty acid, known under the trademark of Unitol DSR. All of these products are blended together in liquid form to arrive at the liquid industrial solvent. It is believed that the percentages by volume listed above form the preferred embodiment of the invention and are the most effective for treating oil spills or other petroleum waste such as tar or grease which can be cleaned up.

To utilize the present invention, the composition in liquid form is applied directly at full strength to a petroleum spill or oil spill, even in an ocean environment. The composition described herein is non-toxic, is biodegradable, and is not harmful to human beings or animals or any other portions of the environment. It is believed that the composition will clean up oil petroleum grease and tar by microencapsulating oil molecules, making them much more biodegradable and acting as a true solvent for removing petroleum waste products.

Applicant believes that the overall ratio of volume of materials described herein should not be greatly changed in order to insure the reliability and results obtained with the composition for acting as an industrial solvent. For example, the nonyl phenol should remain approximately 16 to 17 percent by volume. The tall oil fatty acid should remain between 9 and 10 percent by volume of the overall composition and the d-limonene should remain between 73 to 74 percent by volume. As a surfactant substitute, octyl phenol (10 mole) could be substituted in the same percentages (16 to 17 percent) as the previously submitted nonyl phenol.

The importance of the invention in composition is that it is biodegradable, totally safe, and effective as an industrial solvent to tackle grease, oil, tar, oil spills in bodies of water or other places, and oil waste cleanup in a cost-effective, non-toxic way that is totally safe for the environment.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An industrial solvent that is non-toxic to human beings and animals and environmentally safe for cleaning up petroleum waste such as grease, oil, and tar, consisting essentially of:

d-limonene between 73 and 74 percent by volume; ethoxylated nonyl phenol surfactant 16 to 17 percent by volume; and tall oil fatty acid 9 to 10 percent by volume, all of which is combined together in a liquid form, forming the industrial solvent that is at full strength ready to use.

2. An industrial solvent that is non-toxic to human beings and animals and environmentally safe for cleaning up petroleum waste such as grease, oil, and tar, consisting essentially of:

d-limonene between 73 and 74 percent by volume;

ethoxylated octyl phenol (10 mole) surfactant 16 to 17 percent by volume; and a tall oil fatty acid 9 to 10 percent by volume, all of which is combined together in a liquid form, forming the industrial solvent that is at full strength ready to use.

3. An industrial solvent for cleaning up petroleum waste such as tar, oil, or grease, consisting of:

74 percent by volume d-limonene made from processed uniform terpene;

16.25 percent by volume ethoxylated nonyl phenol; and 9.75 percent by volume tall oil fatty acid.

4. An industrial solvent for cleaning up petroleum waste such as tar, oil, or grease, consisting of:

74 percent by volume d-limonene made from processed uniform terpene;

16.25 percent by volume ethoxylated octyl phenol; and 9.75 percent by volume tall oil fatty acid.

* * * * *